Jan. 12, 1954    A. A. FRANTELLO    2,665,515
FISH LURE
Filed July 17, 1950
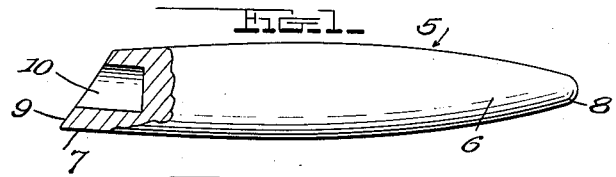
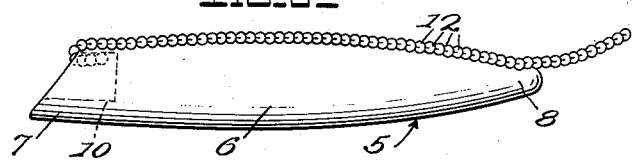
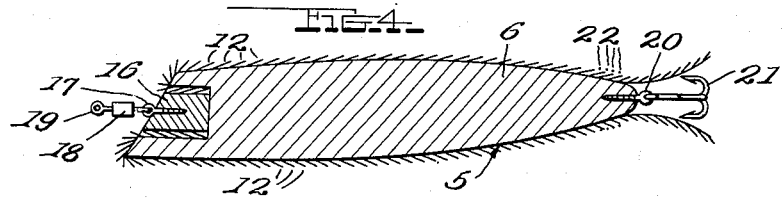
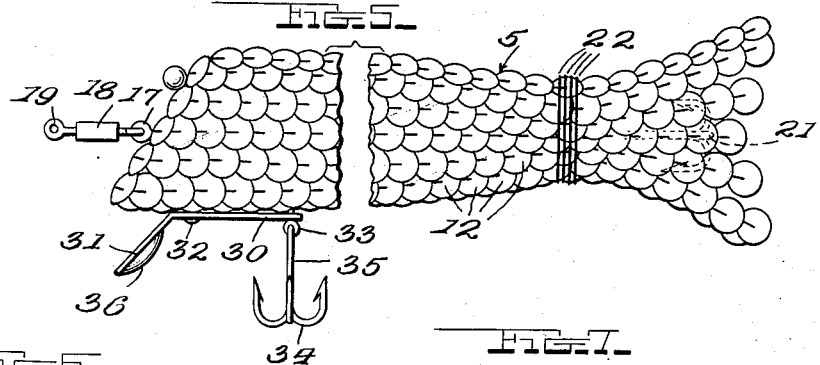
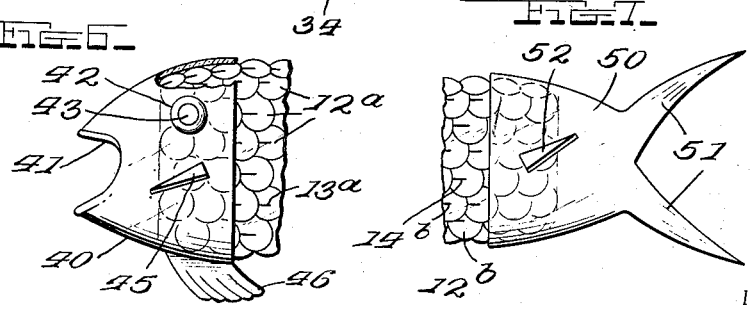
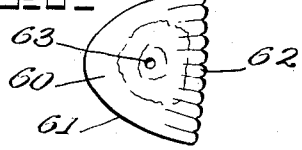
INVENTOR
Alfio A. Frantello,
BY Russell E. Patterson,
ATTORNEY Patented Jan. 12, 1954

2,665,515

UNITED STATES PATENT OFFICE 2,665,515

FISH LURE

Alfio A. Frantello, Wadsworth, N. Y.

Application July 17, 1950, Serial No. 174,228

4 Claims. (Cl. 43—42.33)

The present invention relates to improvements in artificial fish baits and lures, and more particularly to a fish lure of the plug type and a method of making the same.

One object of the invention is to provide an artificial bait or lure of the plug type having a plurality of reflecting surfaces formed of sequins arranged in overlapping relation to resemble the scales of a fish.

Another object is to provide a fish lure or bait having a series of reflecting facets formed of plastic reflecting units arranged such as to utilize total reflection when under water and thus increase the fish getting characteristics of the lure.

Another object is to provide an artificial fish bait of either the plug or minnow type with a series of reflecting units arranged with portions of their edges in overlapping relation to resemble the scales of a fish and provide plane reflecting surfaces arranged at various angles around the periphery of the bait body whereby light will be reflected for considerable distances and will attract fish over a relatively large range of distances and hence increase the fish getting qualities of the lure.

Another object is to provide an artificial lure or bait having a series of relatively thin plastic sequins arranged with their edges in overlapping relation to resemble the scales of a fish, but of sufficient thickness such that light rays will be reflected from the rear surfaces thereof.

Another object is to provide an artificial lure or bait including a bait body having a series of colored plastic members arranged in overlapping relation and preferably formed of a plastic light reflecting material so that the reflected rays from each of the minute reflecting surfaces will resemble and give the appearance of fish scales on a live fish.

Another object is to provide a method of forming fish lures which is both inexpensive in manufacture, and which produces maximum results.

Another object is to provide an artificial fish lure of the above-mentioned type in which the body after being covered with a plurality of plastic reflecting members can have attached to the head and tail thereof plastic caps resembling the head and tail of a fish. Thus, the appearance of the fish is enhanced and made realistic.

Another object is to provide a fish lure having a series of plastic reflecting members secured to the body thereof which are shaped to resemble the scales of a fish and may be vari- colored so that when arranged with their edges in overlapping relation will resemble the scales of a live fish and will provide a plurality of minute light reflecting surfaces.

Other objects and advantages of the invention will become apparent during the course of the following description of the accompanying drawing, wherein:

Figure 1 is a side elevational view of the body portion of the plug bait showing the head thereof broken away or in section to illustrate a cavity for receiving a string of plastic reflecting members to be applied to the body surface.

Figure 2 is a top elevational view of an assembly including a series of plastic sequins mounted on a flexible element to be attached to the plug body.

Figure 3 is a side elevational view of the plug body showing the manner in which the plastic pre-shaped reflecting units are applied to the plug body.

Figure 4 is a longitudinal cross-sectional view showing the manner in which the assembled reflecting units are secured to the front end of the plug body by means of an insert.

Figure 5 is a side elevational view of the completed artificial lure or bait showing the manner in which the reflecting unit assemblies are secured together at their rear portions by means of a tying element to form a flared tail portion.

Figure 6 is a fragmentary side elevational view of an artificial lure or bait of the minnow type showing a cap shaped to resemble the head of a fish affixed to the front end of a lure embodying the invention.

Figure 7 is a fragmentary side elevational view of an artificial bait or lure of the minnow type showing a tail cap affixed to the rear end of the bait body to resemble the tail of a fish, and Figure 8 is a side elevational view of a modified reflecting unit in the shape of a fish scale of a particular species of fish.

In the drawing, and more in detail, there is shown for the purpose of convenience of illustration a fish lure in Figures 1 to 5 embodying the invention and generally, the reference character 5 will designate the fish lure which includes a body 6 of round section which is shaped throughout its length to provide a head portion 7 and a tail portion 8. Thus, a pisces-shaped body is provided having an angular front wall or nose 9 to cause the lure to travel along an irregular pathway when drawing the same through the water. Extending rearwardly from the inclined surface 9 is a cavity or bore 10 which terminates a short distance from the outer portion of the head 7.

The plug body 6 is covered with a series of relatively small pre-shaped reflecting units 12 having central openings 13 for receiving a flexible retaining member 14. The pre-shaped reflecting units 12 are formed of one of the well known synthetic plastic compositions such as methyl-methacrylate or of isinglass or mica, or any composition having thermo-setting characteristics having a high gloss surface. In practice, it has been found that sequins which are generally made of mica or of one of the above plastic compositions can be advantageously used, since they can be obtained in various colors and are of disk-like shape. In addition, mica or plastic sequins as used for ornamenting dresses and the like are stamped with a central opening which permits the sequins to be threaded on a flexible retaining member such as a wire or waterproofed thread 14.

In assembling the reflecting units 12 the flexible retaining member 14 is threaded through the central openings 13 thereof so that the assembly when laid flat upon a surface will cause the reflecting units to become self-arranged in overlapping relation as shown in Figure 2.

After the reflecting units have been assembled as shown in Figure 2, one end is placed within the opening or bore 10 and the other end is arranged adjacent the outer peripheral surface of the tail 8 so that the intermediate portion extends longitudinally of the plug body 6. A large number of reflecting unit assemblies are thus secured in side by side relation on the plug body 6 with the reflecting units of one assembly slightly overlapping the edges of the reflecting units of an adjacent assembly.

After the plug body 6 has been completely covered with the pre-shaped sequins or plastic reflecting units 12, a wooden plug 16 is inserted in the bore 10 to frictionally anchor the front ends of the flexible securing members 14 of each reflecting unit assembly in position. The plug 16 is slightly smaller in diameter than the bore 10 to accommodate the front ends of the reflector unit assemblies and securely hold the same in place. A screw eye 17 is threaded in the plug 16 and a swivel connection 18 is attached thereto having an eye 19 for receiving a leader or fish line (not shown). Similarly, a screw eye 20 is anchored in the tail portion 8 to which is attached a conventional multi-prong or barbed hook 21.

It is to be noted that the reflector unit assemblies including the plastic disks or sequins 12 and the flexible supporting member 14 are of a greater length than the plug body 6, so that they will extend beyond the tail 8 of said body 6 to form a life-like appearing fish tail portion 21 generally designated in Figure 5.

In order to hold the rear portions of the reflector unit assemblies in place, a tying element 22 is wound therearound as shown in Figure 5 a distance slightly spaced from the tail 8 of the body 6 so that the tying element will clamp the rear portions of the reflector elements closely to the plug body 6.

After the bait or lure body has thus been formed and the reflector unit assemblies secured to the outer peripheral surface of the plug body 6, it is coated with a waterproof composition such as "Fablon" which is a plastic waterproof composition composed of a synthetic resin (polyvinyl chloride) of the transparent type.

Secured to the underside of the fish lure is a plate 30 having an angular end portion 31 extending obliquely to the axis of the lure to cause the lure to travel along an irregular pathway when drawn through the water. The plate 30 is secured in place by a fastening element 32 at the front thereof and by means of a screw eye 33 at its rear portion. A multi-barbed fish hook 34 has its shank 35 attached to the screw eye 33 in the usual manner. The angular front end portion 31 is depressed as at 36 to provide a dished portion to cause the lure to travel through the water in an irregular and erratic manner.

In the modified form of the invention shown in Figure 6 a core body similar to the body 6 is employed and is covered with thin light reflecting units 12a supported on a plurality of longitudinally extending flexible members 13a. The plug body is cut transversely at its front end and a cap 40 formed of thermo-setting plastic material is slipped over the front end of the lure and held in place by being glued or adhesively secured. The cap 40 is shaped to provide a mouth portion 41 and tacks 42 are passed through the cap 40 and have their inner ends anchored in the core body to additionally hold the cap in place. White-headed tacks 42 are employed and may have their central area covered as at 43 such that the tack will resemble a fish eye. Appendages such as fins 45 and 46 are formed on the cap 40 to assist in guiding the minnow type lure when drawn through the water. It being noted that the fin 45 is inclined downwardly so that the lure will dip to and fro while being drawn through the water.

In the modified form of the invention shown in Figure 7 a plug body similar to that shown in Figures 1 to 5 inclusive is employed and said body is covered with relatively thin light reflecting units 12b such as sequins having central apertures for receiving the flexible retaining members 14b. Said light reflecting units 12b being secured to the body at its front end as shown in Figures 1 to 5 inclusive or Figure 6, and being shaped at the rear in substantially the same manner to provide a recess for receiving the ends of the flexible supporting members 14b. It being understood that a plug similar to the one shown in Figure 4 at 16 will be employed for anchoring the rear end of the flexible supporting members 14b in position. Secured to the rear or tail portion of the lure is a cap 50 formed of thermo-setting plastic material and shaped to provide tail fins 51. Dorsal or other fins 52 may be formed on the cap 50 as desired. The cap 50 may be colored to resemble a live fish in substantially the same manner as pointed out in connection with the cap 40, and the cap 50 is provided with an interior cavity conforming in shape to the tail portion of the fish lure so that it may be snugly applied thereto and adhesively held in place by the use of waterproof glue in the same manner as pointed out in connection with the cap 40.

In the modified form of the invention shown in Figure 8 the light reflecting units 12, 12a and 12b shown in Figures 1 to 7 inclusive can be replaced by light reflecting units 60 formed of thermo-setting plastic material of relatively thin section and shaped to resemble the individual scales of a fish. As shown in Figure 8 the light reflecting unit is shaped to provide elliptical edge portions 61 and a serrated or scalloped edge 62. A central opening 63 is formed in the light reflecting unit 60 so that a series of the same may be threaded on a flexible securing member such as a cord or wire similar to that shown at 14 in Figures 1 to 5 inclusive. The reflecting unit 60 may be colored and obviously can be shaped to resemble the individual scales of various species of fish. The light reflecting units 60 are applied to the bait body in substantially the same manner as pointed out before and can be used in lieu of the commercial sequins if desired.

It is to be understood that the forms of the invention herewith shown and described are to be taken as preferred embodiments thereof, and that various changes in the shape, size and arrangement of parts may be resorted to without departing from the spirit of the invention or the scope of the subjoined claims.

I claim:

1. In an artificial fish lure, an elongated plug body, a series of cords extending from one end to the other of the plug in substantially spaced parallelism, a plurality of thin light reflecting units having central openings through which said cords pass, the said units being disposed with their lateral and longitudinal edges in overlapping relationship with the edges of adjacent units, and a coating of transparent waterproofing material covering said units and cords adhering the same together in said overlapped relationship and to said plug body.

2. In an artificial fish lure, an elongated plug body, a series of cords extending from one end to the other of said plug in substantially spaced parallelism, a plurality of thin light reflecting units having central openings receiving said cords, the units on each cord spaced from each other longitudinally thereof with their adjacent edges engaging in overlapping relationship, the units of each cord having their side portions engaged in overlapping relationship with the units of adjacent cords, and means for securing said cords and units upon said plug body.

3. In an artificial fish lure, an elongated plug body, a series of cords extending from one end to the other of said body in substantially spaced parallelism, a plurality of thin light reflecting units having central openings receiving said cords, the units on each cord spaced from each other longitudinally of the cords with their adjacent edges engaging in overlapping relationship, the units of each cord having their side portions engaged in overlapping relationship with the units of adjacent cords, and a coating of transparent waterproofing material covering said units and cords adhering said units together in said overlapping relationship and the units and said cords to said plug body.

4. In an artificial fish lure, an elongated plug body, a series of cords extending longitudinally of said body in spaced parallel relationship and projecting beyond one end of said body, a plurality of light reflecting units having central openings receiving said cords and extending from one end to the other thereof, the units on each cord spaced from each other longitudinally of their respective cords with adjacent edges engaging in overlapped relationship, the units of each cord throughout the length of said body having their side portions engaged in overlapping relationship with the units of adjacent cords, and means for securing said cords to said body and said units to one another in said overlapped relationship and to said body.

ALFIO A. FRANTELLO.

References Cited in the file of this patent

UNITED STATES PATENTS

| Number | Name | Date |
|---|---|---|
| 1,737,683 | Readman | Dec. 3, 1929 |
| 1,814,641 | Smith et al. | July 14, 1931 |
| 2,216,929 | Zander et al. | Oct. 8, 1940 |
| 2,479,239 | Johnson | Aug. 16, 1949 |
| 2,510,566 | Flaherty | June 6, 1950 |
| 2,583,942 | Harvey | Jan. 29, 1952 |

FOREIGN PATENTS

| Number | Country | Date |
|---|---|---|
| 314,594 | Germany | Oct. 2, 1919 |